(12) United States Patent
Luo et al.

(10) Patent No.: US 9,124,409 B2
(45) Date of Patent: Sep. 1, 2015

(54) DETERMINING CONTROL REGION PARAMETERS FOR MULTIPLE TRANSMISSION POINTS

(75) Inventors: Tao Luo, San Diego, CA (US); Durga Prasad Malladi, San Diego, CA (US); Juan Montojo, San Diego, CA (US); Yongbin Wei, San Diego, CA (US); Xiaoxia Zhang, San Diego, CA (US); Ke Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 12/843,207

(22) Filed: Jul. 26, 2010

(65) Prior Publication Data

US 2011/0026473 A1 Feb. 3, 2011

Related U.S. Application Data

(60) Provisional application No. 61/230,063, filed on Jul. 30, 2009.

(51) Int. Cl.
*H04W 4/00* (2009.01)
*H04L 5/00* (2006.01)

(52) U.S. Cl.
CPC ............ *H04L 5/0094* (2013.01); *H04L 5/0035* (2013.01); *H04L 5/0053* (2013.01)

(58) Field of Classification Search
CPC .... H04L 5/0035; H04L 5/0094; H04L 5/0053
USPC .................................................. 370/329, 315
See application file for complete search history.

(56) References Cited

U.S. PATENT DOCUMENTS

| 8,325,863 B2 | 12/2012 | Stamoulis et al. |
| 2006/0291403 A1 | 12/2006 | Kahtava et al. |
| 2009/0052387 A1 | 2/2009 | Lee et al. |

(Continued)

FOREIGN PATENT DOCUMENTS

| CN | 201018490 Y | 2/2008 |
| CN | 101321148 A | 12/2008 |

(Continued)

OTHER PUBLICATIONS

Ericsson: "Downlink CoMP", 3GPP Draft, R1-090914 (DL COMP}, 3rd Generation Partnership Project (3GPP), Mobile Competence Centre, 650, Route Des Lucioles, F-06921 Sophia-Antipolis Cedex, France, no. Athens, Greece, Feb. 4, 2009, XP050318755, [retrieved on Feb. 4, 2009].

(Continued)

*Primary Examiner* — Donald Mills
*Assistant Examiner* — Henry Baron
(74) *Attorney, Agent, or Firm* — Dalei Dong

(57) ABSTRACT

Systems and methodologies are described that facilitate determining control region parameters related to a plurality of carriers and/or coordinated multiple point (CoMP) access points. Wireless devices can receive control region parameters related to the carriers or CoMP access points from a serving access point over control channel resources. Additionally or alternatively, wireless devices can assume all carriers or CoMP access points have substantially the same control region as indicated in a control format indicator channel from the serving access point or based on a configured value.

49 Claims, 14 Drawing Sheets

(56) References Cited

U.S. PATENT DOCUMENTS

| | | | |
|---|---|---|---|
| 2009/0300456 | A1 | 12/2009 | Pelletier et al. |
| 2010/0142455 | A1 | 6/2010 | Imamura |
| 2010/0232373 | A1 | 9/2010 | Nory et al. |
| 2010/0232382 | A1 | 9/2010 | Gauvreau et al. |
| 2010/0254329 | A1 | 10/2010 | Pan et al. |
| 2010/0279628 | A1 | 11/2010 | Love et al. |
| 2010/0303039 | A1* | 12/2010 | Zhang et al. ............... 370/331 |
| 2011/0021191 | A1 | 1/2011 | Damnjanovic et al. |
| 2011/0116456 | A1 | 5/2011 | Gaal et al. |
| 2011/0194501 | A1 | 8/2011 | Chung et al. |
| 2012/0039179 | A1 | 2/2012 | Seo et al. |

FOREIGN PATENT DOCUMENTS

| | | |
|---|---|---|
| CN | 101411086 A | 4/2009 |
| EP | 1944896 A1 | 7/2008 |
| JP | 2010516129 A | 5/2010 |
| JP | 2010183201 A | 8/2010 |
| JP | 2010528554 A | 8/2010 |
| JP | 2011529661 A | 12/2011 |
| WO | WO-2006042326 | 4/2006 |
| WO | 2008147123 A1 | 12/2008 |
| WO | WO-2009014401 A2 | 1/2009 |
| WO | 2010106786 A1 | 9/2010 |

OTHER PUBLICATIONS

Huawei, Qualcomm Europe, RITT, CMCC: Solutions for DL CoMP Transmission—For Issues on Control Zone, CRS and DRS, 3GPP TSG RAN WGI Meeting 56, Feb. 9, 2009, pp. 1-9, XP002630581, Athens, Greece Retrieved from the Internet: URL:http://ftp.3gpp.org/tsg_ran/WGI_RLI/TS GRI_56/Docs/ [retrieved on Mar. 28, 2011].

International Search Report and Written Opinion—PCT/US2010/044008, ISA/EPO—May 11, 2011.

Samsung: "Design Considerations for COMP Joint Transmission", 3GPP Draft, R1-091868 Design Considerations for Comp Joint Transmission, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339364, [retrieved on Apr. 28, 2009].

Huawei: "Inter-eNB and Intra-eNB Schemes for CoMP in LTE-Advanced", 3GPP Draft TSG RAN WG#54; R1-083050, 3rd Generation Partnership Project (3GPP), Jeju, Korea, (Aug. 18-22, 2008).

LG Electronics: "Dynamic Cell Clustering for CoMP", R1-090657, 3GPP TSG RAN WG1 Meeting #56, pp. 1-3, Feb. 9 to 13, 2009.

Nokia Siemens Networks: "Setup of CoMP cooperation areas", R1-090725, 3GPP TSG RAN WG1 Meeting #56, pp. 1-4, Feb. 9 to 13, 2009.

Samsung: "CoMP Operational Mode Feedback Discussions", R1-091869, 3GPP TSG RAN WG1 Meeting #57, May 4 to 8, 2009.

Taiwan Search Report—TW099125459—TIPO—Jun. 4, 2013.

Ericsson: "Control signaling for carrier aggregation", 3GPP TSG-RAN WG1 Meeting #55b, R1-090375, Jan. 12, 2009.

ZTE: "Downlink Control Signalling Design for LTE-A" 3GPP Draft; R1-091429 Downlink Control Signalling Design for LTE-A, 3RD Generation Partnership Project (3GPP), Mobile Competence Centre; 650, Route Des Lucioles; F-06921 Sophia-Antipolis Cedex; France, no. Seoul, Korea; Mar. 17, 2009, XP050339008 p. 2, paragraph 6.1—p. 3.

Huawei: 3GPP TSG RAN WG1 Meeting #56, R1-090821, Solutions for DL CoMP Transmission for Issues on Control Zone, CRS and DRS Athens, 2009, Greece, Feb. 9-13, pp. 1-8.

* cited by examiner

DETERMINING CONTROL REGION PARAMETERS FOR MULTIPLE TRANSMISSION POINTS

CROSS-REFERENCE

This application claims the benefit of U.S. Provisional Application Ser. No. 61/230,063, filed Jul. 30, 2009, and entitled "SIGNALING NUMBER OF CONTROL SYMBOLS IN CoMP TRANSMISSIONS," the entirety of which is incorporated herein by reference.

BACKGROUND

I. Field

The present disclosure relates generally to wireless communications and more specifically to coordinating communications from multiple transmission points.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating determining a control region utilized by a plurality of access points and/or related carriers in a coordinated set. In one example, a size of a control region and/or a starting point of a data region can be signaled by a serving access point to a wireless device for each carrier or access point in the coordinated set. In another example, the wireless device can determine a common control region among the carriers or access points in the coordinated set based at least in part on a received indication specifying the control region of the serving access point and/or an initial carrier related thereto. In yet another example, data can be mapped over similar resource elements for the carriers and/or by the access points such that the wireless device can determine a similar control region for the carriers and/or access points based at least in part on the resource elements that comprise data.

According to an aspect, a method is provided that includes receiving one or more control region parameters regarding a plurality of carriers related to coordinated multiple point (CoMP) communications and determining a data portion of one or more signals received over one of the plurality of carriers based at least in part on the one or more control region parameters. The method also includes determining a disparate data portion of one or more disparate signals received over a disparate one of the plurality of carriers based at least in part on the one or more control region parameters.

Another aspect relates to a wireless communications apparatus. The wireless communications apparatus can include at least one processor configured to obtain one or more control region parameters regarding a plurality of carriers in CoMP communications and decode a data portion of one or more signals received over one of the plurality of carriers based at least in part on the one or more control region parameters. The at least one processor is further configured to decode a disparate data portion of one or more disparate signals received over a disparate one of the plurality of carriers based at least in part on the one or more control region parameters. The wireless communications apparatus also comprises a memory coupled to the at least one processor.

Yet another aspect relates to an apparatus. The apparatus includes means for receiving a control signal comprising one or more control region parameters related to a plurality of carriers in CoMP communications. The apparatus also includes means for determining a control region related to one or more signals received over one of the plurality of carriers and a disparate control region related to one or more disparate signals received over a disparate one of the plurality of carriers based at least in part on the one or more control region parameters.

Still another aspect relates to a computer program product, which can have a computer-readable medium including code for causing at least one computer to obtain one or more control region parameters regarding a plurality of carriers in CoMP communications and code for causing the at least one computer to decode a data portion of one or more signals received over one of the plurality of carriers based at least in part on the one or more control region parameters. The computer-readable medium can also comprise code for causing the at least one computer to decode a disparate data portion of one or more disparate signals received over a disparate one of the plurality of carriers based at least in part on the one or more control region parameters.

Moreover, an additional aspect relates to an apparatus including a receiving component that obtains a control signal comprising one or more control region parameters related to a plurality of carriers in CoMP communications. The apparatus can further include a control region determining component that detects a control region related to one or more signals received over one of the plurality of carriers and a disparate control region related to one or more disparate signals received over a disparate one of the plurality of carriers based at least in part on the one or more control region parameters.

According to another aspect, a method is provided that includes receiving a plurality of control region formats related to communicating CoMP signals over a plurality of carriers and generating a signal comprising one or more control region parameters regarding the plurality of control region formats. The method further includes transmitting the signal over control channel resources to one or more wireless devices.

Another aspect relates to a wireless communications apparatus. The wireless communications apparatus can include at least one processor configured to obtain a plurality of control region formats related to communicating CoMP signals over a plurality of carriers and generate a signal comprising one or more control region parameters related to the plurality of control region formats. The at least one processor is further configured to transmit the signal over control channel resources allocated to one or more wireless devices. The wireless communications apparatus also comprises a memory coupled to the at least one processor.

Yet another aspect relates to an apparatus. The apparatus includes means for receiving a plurality of control region formats related to communicating CoMP signals over a plurality of carriers and means for generating a signal comprising one or more control region parameters regarding the plurality of control region formats. The apparatus also includes means for transmitting the signal over control channel resources to one or more wireless devices.

Still another aspect relates to a computer program product, which can have a computer-readable medium including code for causing at least one computer to obtain a plurality of control region formats related to communicating CoMP signals over a plurality of carriers and code for causing the at least one computer to generate a signal comprising one or more control region parameters related to the plurality of control region formats. The computer-readable medium can also comprise code for causing the at least one computer to transmit the signal over control channel resources allocated to one or more wireless devices.

Moreover, an additional aspect relates to an apparatus including a control parameter receiving component that obtains a plurality of control region formats related to communicating CoMP signals over a plurality of carriers and a control channel signaling component that generates a signal comprising one or more control region parameters regarding the plurality of control region formats. The apparatus can further include a transmitting component that communicates the signal over control channel resources to one or more wireless devices.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
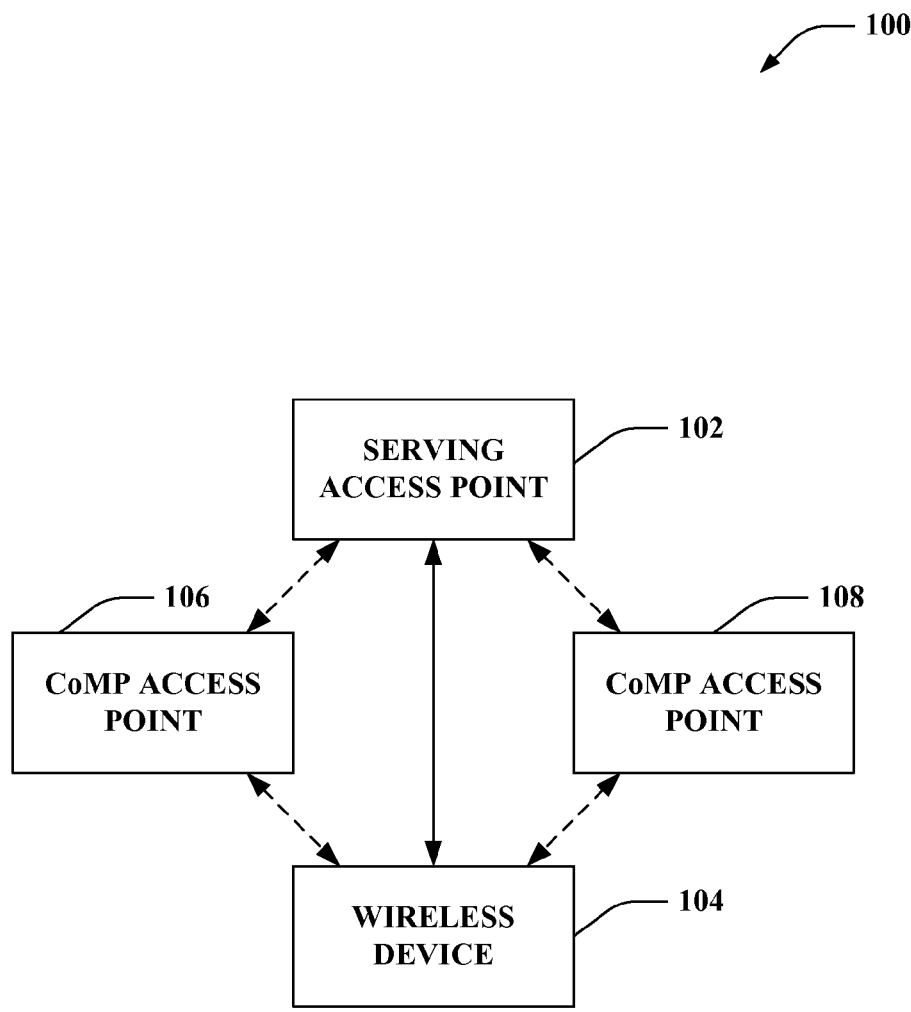
FIG. 1 is a block diagram of a system for providing coordinated multiple point transmissions to a wireless device.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB) or other Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, or digital subscriber line (DSL), or wireless technologies such as infrared, radio, and microwave, then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example system 100 that facilitates providing wireless network access to one or more devices using one or more transmission points. System 100 includes a serving access point 102 that provides a wireless device 104 with access to a core network (not shown) over one or more carriers. The one or more transmission points can relate to multiple carriers assigned by the serving access point 102 to wireless device 104. Additionally or alternatively, for example, one or more coordinated multiple point (CoMP) access points 106 and 108 can be provided as the one or more transmission points. In either case, similar data can be transmitted over the multiple carriers and/or by serving access point 102 and CoMP access points 106 and 108 to wireless device 104 to provide CoMP communications. Such communication can allow increased data rates, for example. Serving access point 102 and CoMP access points 106 and 108 can each be substantially any device that provides access to one or more network components, such as a macrocell access point, femtocell or picocell access point, eNB, mobile base station, relay node, a portion thereof, and/or the like. Wireless device 104 can be substantially any device that receives access to a wireless network, such as a mobile device, UE, modem (or other tethered device), a portion thereof, etc.

According to an example, serving access point 102 and CoMP access points 106 and 108 can coordinate transmissions to provide CoMP communications to wireless device 104. As described, for example, serving access point 102 and CoMP access points 106 and 108 can utilize a network standard (such as 3GPP LTE) that defines a dynamic control region over communication channels (e.g., the first N symbols in a frame can be reserved for control communications where N is an integer between 0 and 3). A symbol can be defined as an orthogonal frequency division multiplexing (OFDM) or other symbol, in one example, which can refer to one or more contiguous or non-contiguous portions of frequency over a period of time. A frame can refer to a portion of time and can, thus, comprise a number of OFDM symbols (e.g., a frame in 3GPP LTE can include 14 OFDM symbols for normal cyclic prefix). For example, serving access point 102 and CoMP access points 106 and 108 can each define a control region, which can vary in size among the access points. In addition, serving access point 102 and CoMP access points 106 and 108 can serve other devices (using CoMP or not), and thus defining a common control region among serving access point 102 and CoMP access points 106 and 108 for communicating with wireless device 104 may not be feasible.

In this regard, for example, control region parameters can be determined by wireless device 104 receiving CoMP transmissions from serving access point 102 and CoMP access points 106 and 108. In one example, serving access point 102 can signal control region parameters (e.g., an index of the starting symbol for data transmission in one or more frames or a control region size) for serving access point 102 and/or CoMP access points 106 and 108 in a control channel communication. Wireless device 104 can obtain the control channel communication and determine the index for the start of data for each of serving access point 102 and CoMP access points 106 and 108 to appropriately receive CoMP data transmissions. In another example, serving access point 102 broadcasts its control region size (e.g., in a physical control format indicator channel (PCFICH) in 3GPP LTE). Wireless device 104 can receive the control region size (e.g., as a number of OFDM symbols) and can assume the same size for CoMP access points 106 and 108 to appropriately receive CoMP data transmissions. In yet another example, wireless device 104 can assume a fixed control region size among serving access point 102 and CoMP access points 106 and 108 without receiving an indicator (e.g., this can be configured at wireless device 104).

Moreover, in another example, where serving access point 102 signals control region parameters for serving access point 102 and CoMP access points 106 and 108 that differ from a control region size broadcasted for serving access point 102, wireless device 104 can determine an empty portion of the control region. For instance, serving access point 102 can specify control region parameters for CoMP communications that indicate a 2 symbol control region and serving access point 102 can broadcast a 3 symbol control region over a control format indicator channel; thus, serving access point 102 has an extra symbol in its control region. In this example, wireless device 104 can utilize the blank portion of the control region (e.g., one or more symbols) to estimate interference from surrounding access points, receive special control signaling from serving access point 102, and/or the like. In yet another example, serving access point 102 can signal a subset of symbols in a frame used for CoMP data transmissions by serving access point 102 and CoMP access points 106 and 108. Thus, wireless device 104 can utilize remaining symbols to perform interference estimation, receive non-CoMP transmissions, and/or the like.

Additionally or alternatively to utilizing CoMP access points 106 and 108 to increase data rates at wireless device 104, as described, serving access point 102 (and/or CoMP access points 106 and 108) can communicate with wireless device 104 over multiple carriers. As each carrier can have a separately defined control region, serving access point 102 can similarly signal control region parameters for the multiple carriers to wireless device 104, broadcast a control region size for an initial carrier (e.g., via a PCFICH), and/or the like. Similarly, in this example, wireless device 104 can receive the control region parameters from serving access point 102 for the multiple carriers, assume a control region size across all carriers based on a broadcasted size or otherwise, and/or the like, as described.

Figure 2:
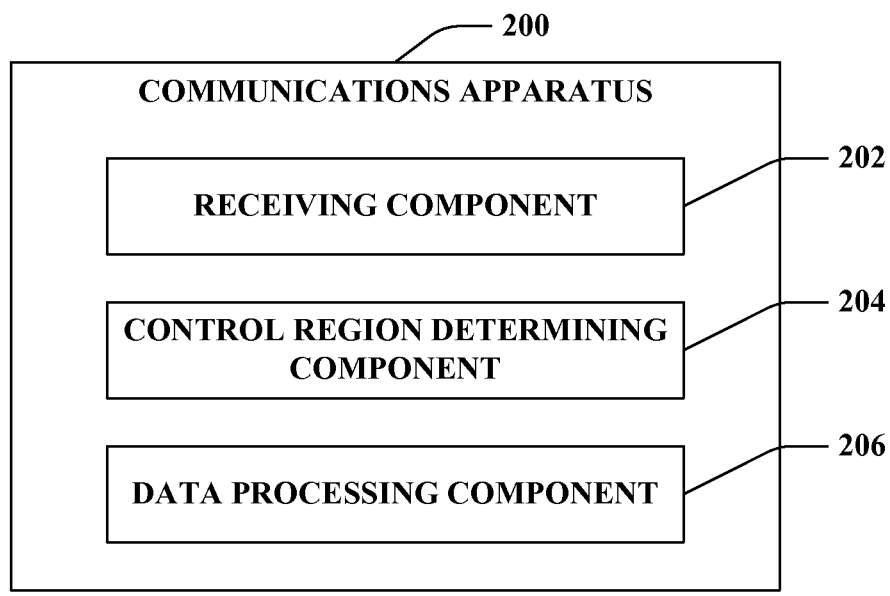
FIG. 2 is an illustration of an example communications apparatus for use in a wireless communications environment.

Referring next to FIG. 2, a communications apparatus 200 that can participate in a wireless communications network is illustrated. The communications apparatus 200 can be a mobile device, access point, a portion thereof, or substantially any device that can receive RSs in a wireless network. The communications apparatus 200 can include a receiving component 202 that obtains communications from one or more access points (not shown) over one or more carriers, a control region determining component 204 that discerns a control region related to the one or more access points and/or one or more carriers, and a data processing component 206 that determines data transmitted by the one or more access points and/or over the one or more carriers following the discerned control region.

According to an example, receiving component 202 can obtain signals from one or more access points (e.g., in CoMP communications) and/or over one or more carriers, which can include at least a control region and a data portion. Control region determining component 204 can locate the control region, and data processing component 206 can retrieve data from at least a portion of the signal that is not in the control region. As described, the control region can be dynamic such that it can comprise a varying number of symbols or other measures of frequency over time related to the signal.

As described, control region determining component 204 can determine or assume control region parameters related to the one or more access points and/or over the one or more carriers in a variety of ways. In one example, receiving component 202 can obtain a signal over a control channel (e.g., physical downlink control channel (PDCCH) in 3GPP LTE) that specifies control region parameters for the one or more access points in CoMP communications and/or the one or more carriers. For example, a number of initial symbols utilized for control resources, an index of a starting symbol for data transmissions, indices related to control resources (e.g., a starting and ending symbol or explicit symbol indices), and/or the like can be specified as control region parameters in the signal over the control channel for at least one of the one or more access points or carriers. In this regard, control region determining component 204 can determine a control region in signals received from the one or more access points or over the one or more carriers based on the control region parameters, and data processing component 206 can decode data in the signals beyond the control region.

In another example, receiving component 202 can obtain a signal from a serving access point that specifies a control region format. Control region determining component 204, in this example, can receive the control region format and utilize the control region format for the one or more access points and/or carriers. In yet another example, control region determining component 204 can obtain a configured parameter that specifies a fixed control region size, and can associate the configured control region size with the one or more access points or carriers. In either case, data processing component 206 can attempt to obtain data from the remainder of the signal.

Figure 3:
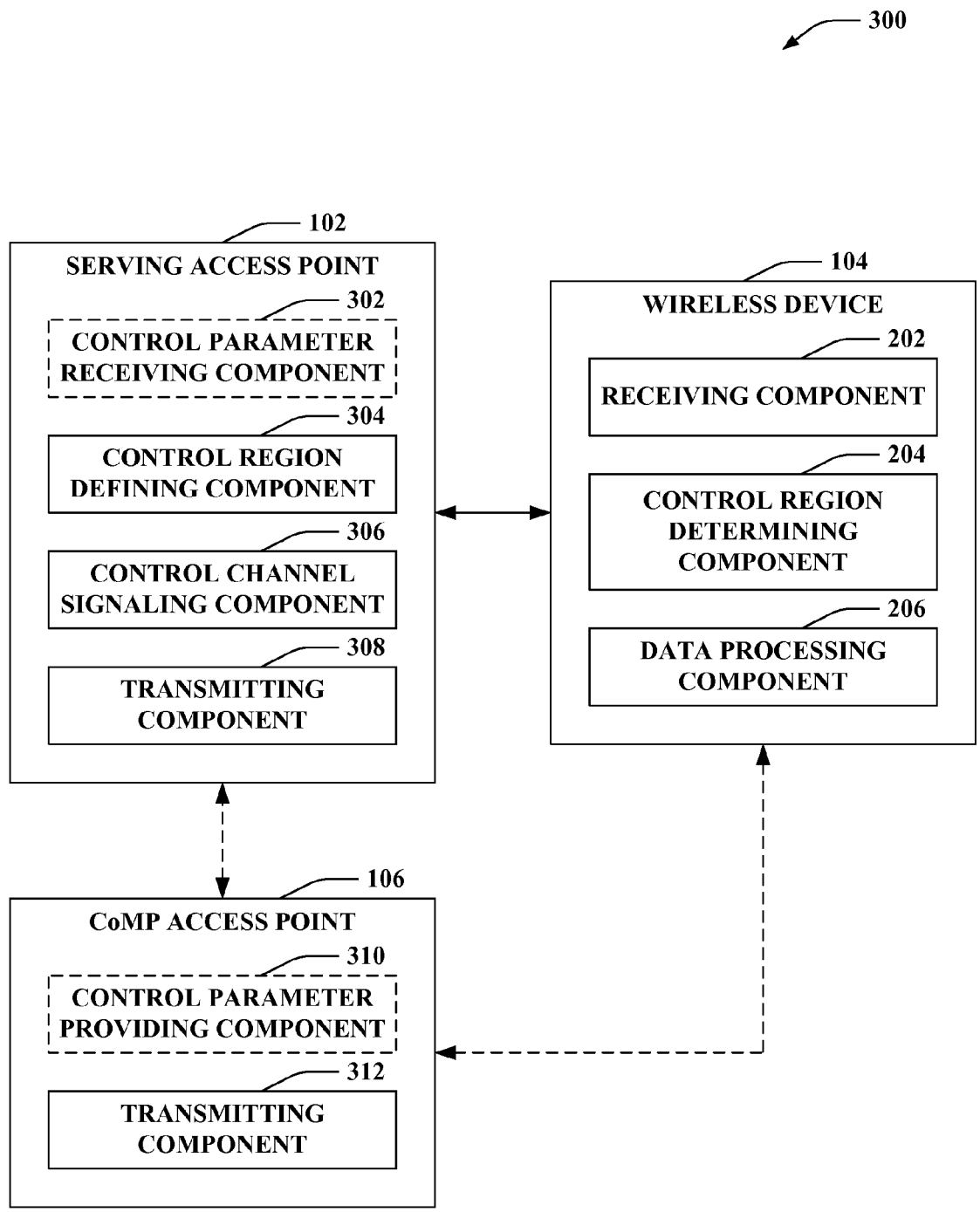
FIG. 3 illustrates an example wireless communication system for determining control region parameters for multiple transmission points.

Now referring to FIG. 3, illustrated is a wireless communications system 300 that facilitates determining control region parameters for multiple transmission points. System 300 includes a serving access point 102 that provides one or more wireless devices, such as wireless device 104, with access to a core network (not shown). Moreover, serving access point 102 can communicate with the wireless device 104 over one or more carriers. In addition, CoMP access point 106 can provide CoMP transmissions of serving access point 102 communications to wireless device 104, which it can receive from serving access point 102 over a backhaul link or otherwise. Serving access point 102 and CoMP access point 106 can each be a macrocell access point, femtocell access point, picocell access point, mobile base station, a portion thereof, and/or substantially any device that provides wireless network access. In addition, for example, wireless device 104 can be a UE, modem (or other tethered device), a portion thereof, and/or substantially any device that receives access to a wireless network.

Serving access point 102 comprises a control parameter receiving component 302 that obtains one or more parameters regarding a control region from a CoMP access point and a control region defining component 304 that specifies a control region size for serving access point 102. Serving access point 102 also includes a control channel signaling component 306 that generates one or more signals for transmitting over control channel resources allocated to one or more wireless devices and a transmitting component 308 that transmits one or more signals in a wireless network.

CoMP access point 106 comprises a control parameter providing component 310 that communicates one or more parameters regarding a control region of the CoMP access point 106 to a serving access point in CoMP communications and a transmitting component 312 that communicates CoMP transmissions to one or more wireless devices. Wireless device 104 includes a receiving component 202 that obtains communications from a serving access point and/or one or more CoMP access points, a control region determining component 204 that retrieves one or more parameters regarding a control region used by the serving access point and/or one or more CoMP access points and determines control regions of received signals based on the one or more parameters, and a data processing component 206 that extracts data from a signal based at least in part on the determined control region.

According to an example, control parameter receiving component 302 can determine a control region format utilized by CoMP access point 106. In one example, control parameter providing component 310 can communicate the control region format to serving access point 102 (e.g., using a backhaul link, a dedicated signal to the serving access point 102, via one or more wireless devices, and/or the like). After control parameter receiving component 302 obtains the control region format for CoMP access point 106, control channel signaling component 306 can generate a control signal that includes the control region format. For example, the control region format can specify a number of symbols from the beginning of the frame that comprise the control region, an index of a starting symbol for data transmission in the frame, and/or the like. In addition, control channel signaling component 306 can similarly specify control region formats for other CoMP access points (not shown) in the control signal and/or a disparate control signal. In one example, control channel signaling component 306 can specify a single control region format related to substantially all access points participating in the CoMP communications (e.g., serving access point 102, CoMP access point 106 and one or more additional CoMP access points). Transmitting component 308 can transmit the control signal to wireless device 104 over control channel resources allocated thereto.

Moreover, for example, control region defining component 304 can determine a control region format for serving access point 102. In one example, control channel signaling component 306 can transmit the control region format for serving access point 102 in a control format indicator signal (e.g., over a PCFICH). Additionally or alternatively, control channel signaling component 306 can transmit the control region format for serving access point 102 in the control signal with control region parameters for the CoMP access point 106 (and/or other CoMP access points). In any case, receiving component 202 can obtain the one or more control signals from serving access point 102.

Control region determining component 204 can discern a control region related to serving access point 102 and/or CoMP access point 106, as described above, whether received over the control channel resources, control format indicator channel resources, a configured value, etc. For example, based at least in part on the control signal, control region determining component 204 can obtain the control region format of CoMP access point 106, which can specify a number of symbols at the frame beginning to comprise the control region. In addition, control region determining component 204 can determine the control region format for serving access point 102 from the same control signal, a disparate control signal, a control format indicator signal (e.g., sent over a PCFICH), etc., received from serving access point 102.

Transmitting component 308 can subsequently transmit signals to wireless device 104. Receiving component 202 can obtain the signals and control region determining component 204 can detect a control region in the signals based at least in part on the control region format received for serving access point 102. Data processing component 206 can interpret data from the remaining portion of the signal. Similarly, CoMP access point 106 can transmit substantially the same signal to wireless device. Receiving component 202 can obtain the signal, control region determining component 204 can discern a control region in the signal based at least in part on the control region format received or determined for CoMP access point 106, and data processing component can interpret similar data from the remaining portion of the signal from CoMP access point 106.

In this regard, for example, serving access point 102 can utilize a 3 symbol control region and CoMP access point 106 can utilize a 2 symbol control region for CoMP transmissions. Thus, control channel signaling component 306 can provide this information to wireless device 104, as described, and control region determining component 204 detects the control region for signals from serving access point 102 from symbols 0 through 3, and 0 through 2 for the CoMP access point 106, for example. Thus, data processing component 206 can decode data from signals received from serving access point 102 starting at the fourth symbol and starting from the third symbol for signals from CoMP access point 106.

In another example, serving access point 102 does not transmit control region formats for CoMP access points. In this example, control region defining component 304 determines a control region for serving access point 102, and control channel signaling component 306 generates a control format indicator signal that includes the control region format for serving access point 102. Transmitting component 308 can communicate the control format indicator signal over a PCFICH or similar channel to wireless device 104. Receiving component 202 can receive the control format indicator signal (e.g., over PCFICH resources), and control region determining component 204 can associate the control region format with serving access point 102, as well as CoMP access point 106 (and/or other CoMP access points).

In a similar example, control region determining component 204 can determine a configured control region format for serving access point 102 and CoMP access point 106. The configured control region format can be determined from a hardcoding, network specification, configuration, and/or the like. In either case, as described, the control region format can relate to a number of symbols from the beginning of a frame that comprise the control region, an index of a symbol related to the start of data communications in a frame, a starting and ending symbol of the control region, explicit symbols in the frame that define the control region, and/or the like. In any case, transmitting component 308 and transmitting component 312 can communicate signals to wireless device 104, as described. Receiving component 202 can obtain the signals, and control region determining component 204 can detect the control region in the signals based on the received or determined control region format, as described. Data processing component 206 can interpret data in the remaining portions of the symbol that are not within the control region, as described.

Moreover, for example, though described in terms of multiple transmission points in CoMP communications, the foregoing can be applied to determine control regions of multiple carriers assigned to wireless device 104 by serving access point 102. For example, control region defining component 304 can specify control region formats for each carrier between serving access point 102 and wireless device 104, control channel signaling component 306 can generate control signals that include the control region formats, and transmitting component 308 can transmit the control signals to wireless device (e.g., over PDCCH). Control region determining component 204 can discern the control region formats for the multiple carriers based on the control signals. Similarly, for example, control region determining component 204 can assume a similar format for all carriers related to a received control format indicator signal from serving access point 102 and/or can utilize a configured control region format, as described.

Figure 4:
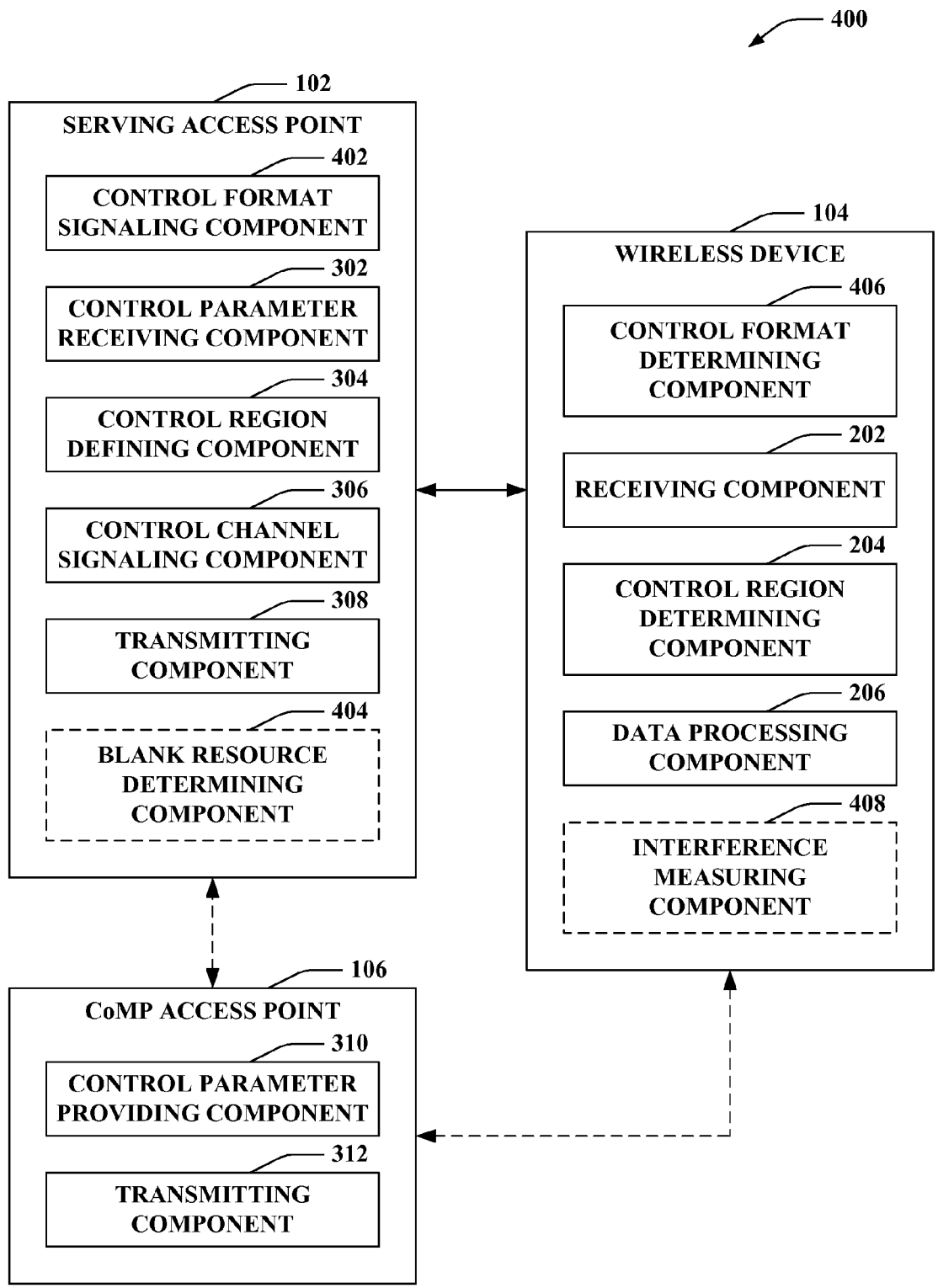
FIG. 4 illustrates an example wireless communication system for obtaining control region parameters from a serving access point.

Turning to FIG. 4, illustrated is a wireless communications system 400 that facilitates indicating control region formats for CoMP communications and utilizing resulting blank symbols. System 400 includes a serving access point 102 that provides one or more wireless devices, such as wireless device 104, with access to a core network (not shown). Moreover, serving access point 102 can communicate with the wireless device 104 over one or more carriers. In addition, CoMP access point 106 can provide CoMP transmissions of serving access point 102 communications to wireless device 104 which it can receive from serving access point 102 over a backhaul link or otherwise. Serving access point 102 and CoMP access point 106 can each be a macrocell access point, femtocell access point, picocell access point, mobile base station, a portion thereof, and/or substantially any device that provides wireless network access. In addition, for example, wireless device 104 can be a UE, modem (or other tethered device), a portion thereof, and/or substantially any device that receives access to a wireless network.

Serving access point 102 comprises a control format signaling component 402 that generates a control format indicator signal, a control parameter receiving component 302 that obtains one or more parameters regarding a control region from a CoMP access point, and a control region defining component 304 that specifies a control region size for serving access point 102. Serving access point 102 also includes a control channel signaling component 306 that generates one or more signals for transmitting over control channel resources allocated to one or more wireless devices, a transmitting component 308 that communicates one or more signals in a wireless network, and a blank resource determining component 404 that can discern one or more blank symbols in a frame based at least in part on a difference in control region format between serving access point 102 and one or more CoMP access points.

CoMP access point 106 comprises a control parameter providing component 310 that communicates one or more parameters regarding a control region of the CoMP access point 106 to a serving access point in CoMP communications and a transmitting component 312 that communicates CoMP transmissions to one or more wireless devices. Wireless device 104 includes a control format determining component 406 that discerns a control region format from a control format indicator signal and a receiving component 202 that obtains communications from the serving access point and/or one or more CoMP access points. Wireless device 104 further comprises a control region determining component 204 that retrieves one or more parameters regarding a control region used by the serving access point and/or one or more CoMP access points, a data processing component 206 that decodes data from a signal based at least in part on the determined control region, and an interference measuring component 408 that determines potential interference from one or more neighboring access point during blank symbol resources.

According to an example, as described, control region defining component 304 can specify a control region format related to serving access point 102. Control format signaling component 402 can generate a control format indicator signal for transmission over a PCFICH, as described, and transmitting component 308 can transmit the signal over the PCFICH. In addition, control parameter providing component 310 can communicate the control region format of CoMP access point 106 to serving access point 102 (e.g., using a backhaul link, a dedicated signal to the serving access point 102, via one or more wireless devices, and/or the like). After control parameter receiving component 302 obtains the control region format for CoMP access point 106, control channel signaling component 306 can generate a control signal that includes the control region format. In addition, control channel signaling component 306 can similarly specify control region formats for other CoMP access points (not shown) in the control signal and/or a disparate control signal. Transmitting component 308 can transmit the control signal to wireless device 104 over control channel resources allocated thereto (e.g., PDCCH).

As described, receiving component 202 can obtain the one or more control signals from serving access point 102. In one example, control format determining component 406 can discern a control region format for serving access point 102 based at least in part on the control format indicator signal. In addition, control region determining component 204 can discern a control region related to CoMP access point 106 (and one or more other CoMP access points), as described above. Transmitting component 308 can subsequently transmit signals to wireless device 104. Receiving component 202 can obtain the signals and control region determining component 204 can detect a control region in the signals based at least in part on the control region format received for serving access point 102. Data processing component 206 can interpret data from the remaining portion of the signal. Similarly, CoMP access point 106 can transmit substantially the same signal to wireless device 104. Receiving component 202 can obtain the signal, control region determining component 204 can discern a control region in the signal based at least in part on the control region format received for CoMP access point 106, and data processing component 206 can interpret similar data from the remaining portion of the signal.

As described, for example, control channel signaling component 306 can specify a single control region format related to substantially all access points participating in the CoMP communications (e.g., serving access point 102, CoMP access point 106 and one or more additional CoMP access points). Where the control format indicator signal related to serving access point 102 and the control region format specified for CoMP communications differ, there can be one or more blank symbols at serving access point 102. For example, if serving access point specifies a control region of 3 symbols and the control region format for CoMP communications specifies 2 symbols, there is an extra symbol utilized by serving access point 102, but not for the CoMP communications. This blank symbol can be utilized for various purposes.

In one example, blank resource determining component 404 can detect the blank symbol by comparing the control region format generated by control region defining component 304 to that received by control parameter receiving component 302. Where control region defining component 304 specifies a larger control region, the remaining portion not received by control parameter receiving component 302 can be utilized to transmit data to wireless device 104 using non-CoMP communications. In one example, the remaining portion can be utilized to signal a subset of symbols utilized for CoMP communication, as described further herein. In another example, interference measuring component 408 can determine the blank symbol based in part on comparing a control region format of serving access point 102 detected by control format determining component 406 to that of CoMP access point 106 as detected by control region determining component 204. Again, where interference measuring component 408 determines more control region resources for serving access point 102, it can utilize the extra resources to detect interference from one or more neighboring access points, or perform other measurements, for example.

Figure 5:
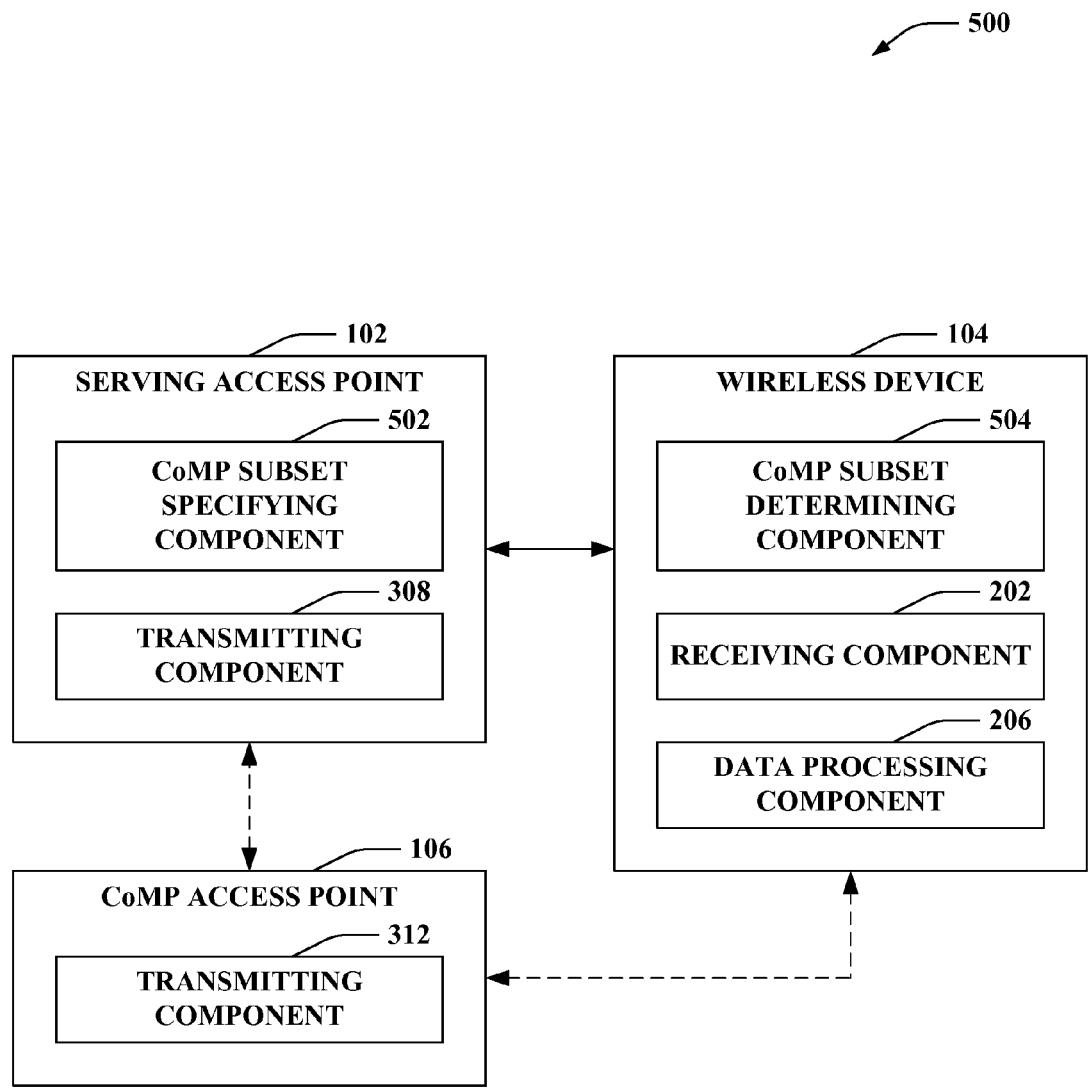
FIG. 5 illustrates an example wireless communication system for indicating a subset of symbols used for data communications.

Referring to FIG. 5, illustrated is a wireless communications system 500 that facilitates indicating a portion of resources related to CoMP communications. System 500 includes a serving access point 102 that provides one or more wireless devices, such as wireless device 104, with access to a core network (not shown). Moreover, serving access point 102 can communicate with the wireless device 104 over one or more carriers. In addition, CoMP access point 106 can provide CoMP transmissions of serving access point 102 communications to wireless device 104, which it can receive from serving access point 102 over a backhaul link or otherwise. Serving access point 102 and CoMP access point 106 can each be a macrocell access point, femtocell access point, picocell access point, mobile base station, a portion thereof, and/or substantially any device that provides wireless network access. In addition, for example, wireless device 104 can be a UE, modem (or other tethered device), a portion thereof, and/or substantially any device that receives access to a wireless network.

Serving access point 102 comprises a CoMP subset specifying component 502 that indicates a subset of symbols in a frame utilized to transmit CoMP communications and a transmitting component 308 that communicates one or more signals in a wireless network. CoMP access point 106 comprises a transmitting component 312 that communicates CoMP transmissions to one or more wireless devices. Wireless device 104 includes a CoMP subset determining component 504 that receives an indication of a subset of symbols utilized for CoMP communications, a receiving component 202 that obtains communications from a serving access point and/or one or more CoMP access points, and a data processing component 206 that determines data from the subset of symbols in received communications.

According to an example, CoMP subset specifying component 502 can determine a subset of symbols in a communication frame for transmitting CoMP signals. In one example, CoMP subset specifying component 502 can determine the subset of symbols from a configuration, hardcoding, network specification, and/or the like or dynamically, based at least in part on available resources, reported signal-to-noise ratio (SNR) at wireless device 104, an identifier of serving access point 102 and/or CoMP access point 106, etc. CoMP subset specifying component 502 can provide an indication of the subset of symbols to wireless device 104. CoMP subset determining component 504 can obtain the indication from serving access point 102 for subsequent determination of data in one or more CoMP signals.

Thus, transmitting component 308 can transmit a CoMP communication signal to wireless device 104, as can transmitting component 312. Receiving component 202 can obtain the signals from serving access point 102 and CoMP access point 106, respectively. Data processing component 206 can extract data from the signals beginning at symbols in each frame that are part of the CoMP subset.

Figure 6:
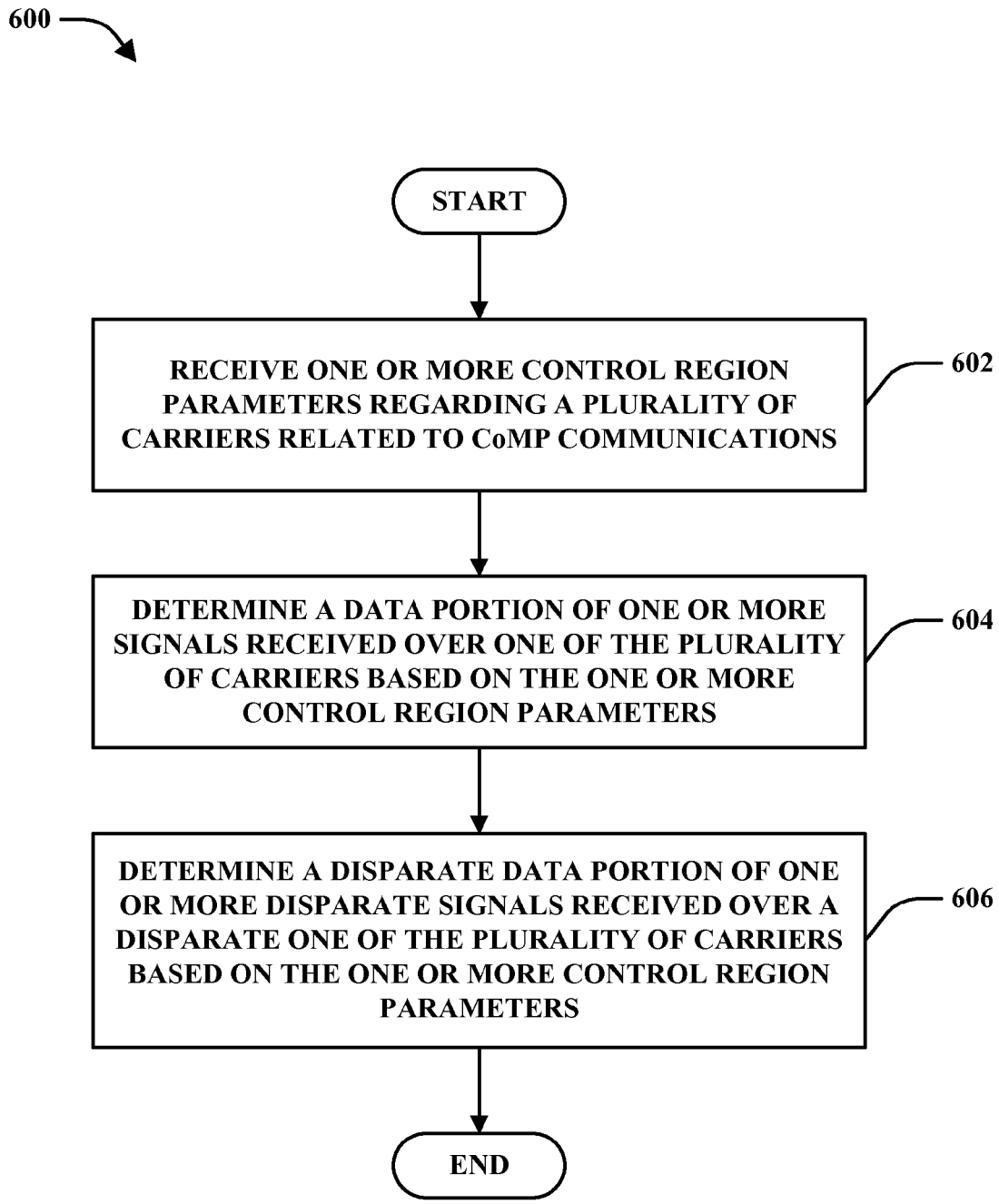
FIG. 6 is a flow diagram of an example methodology that receives control region parameters for multiple transmission points.
Figure 7:
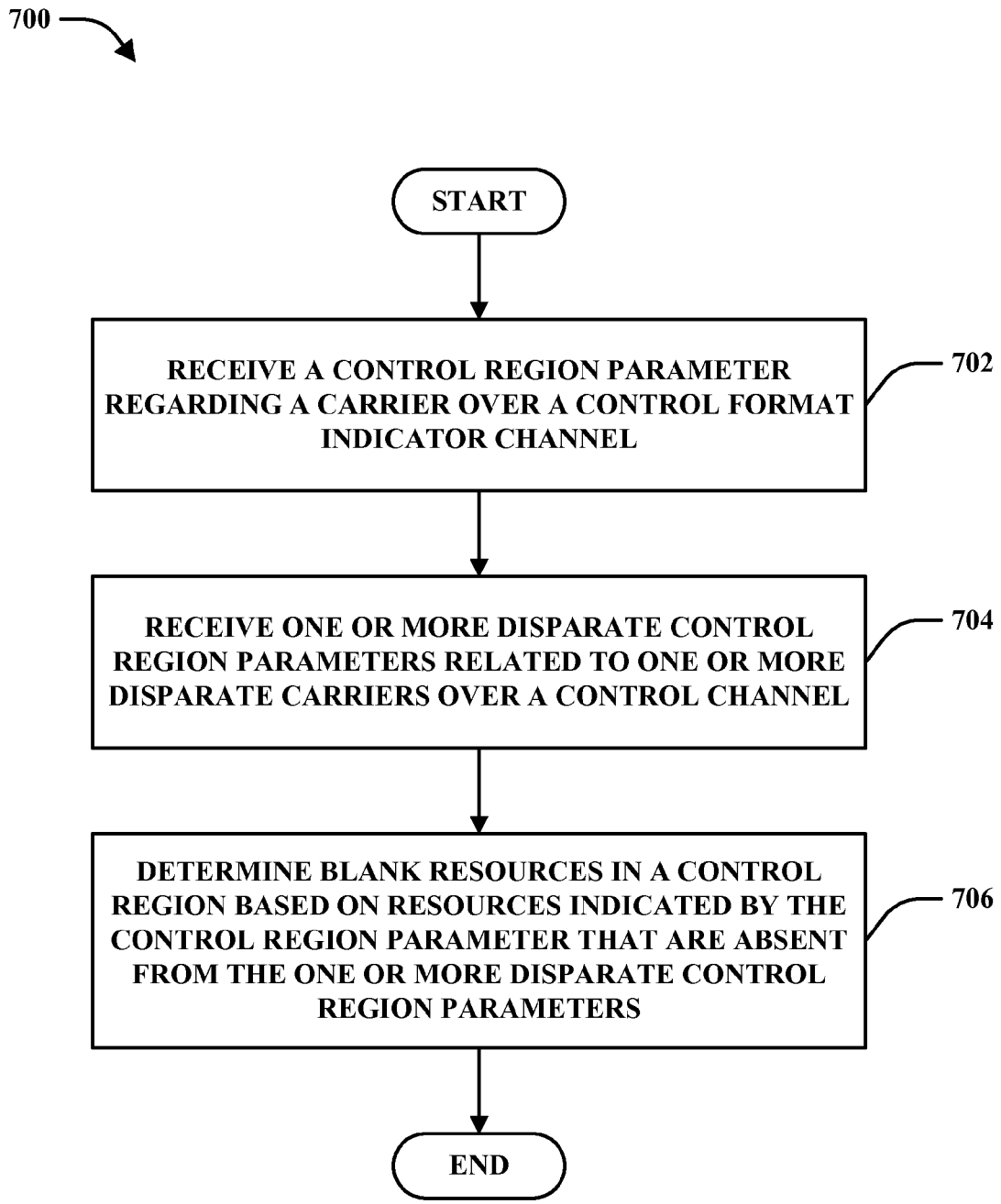
FIG. 7 is a flow diagram of an example methodology that determines blank resources based on disparate control region parameters for disparate access points.
Figure 8:
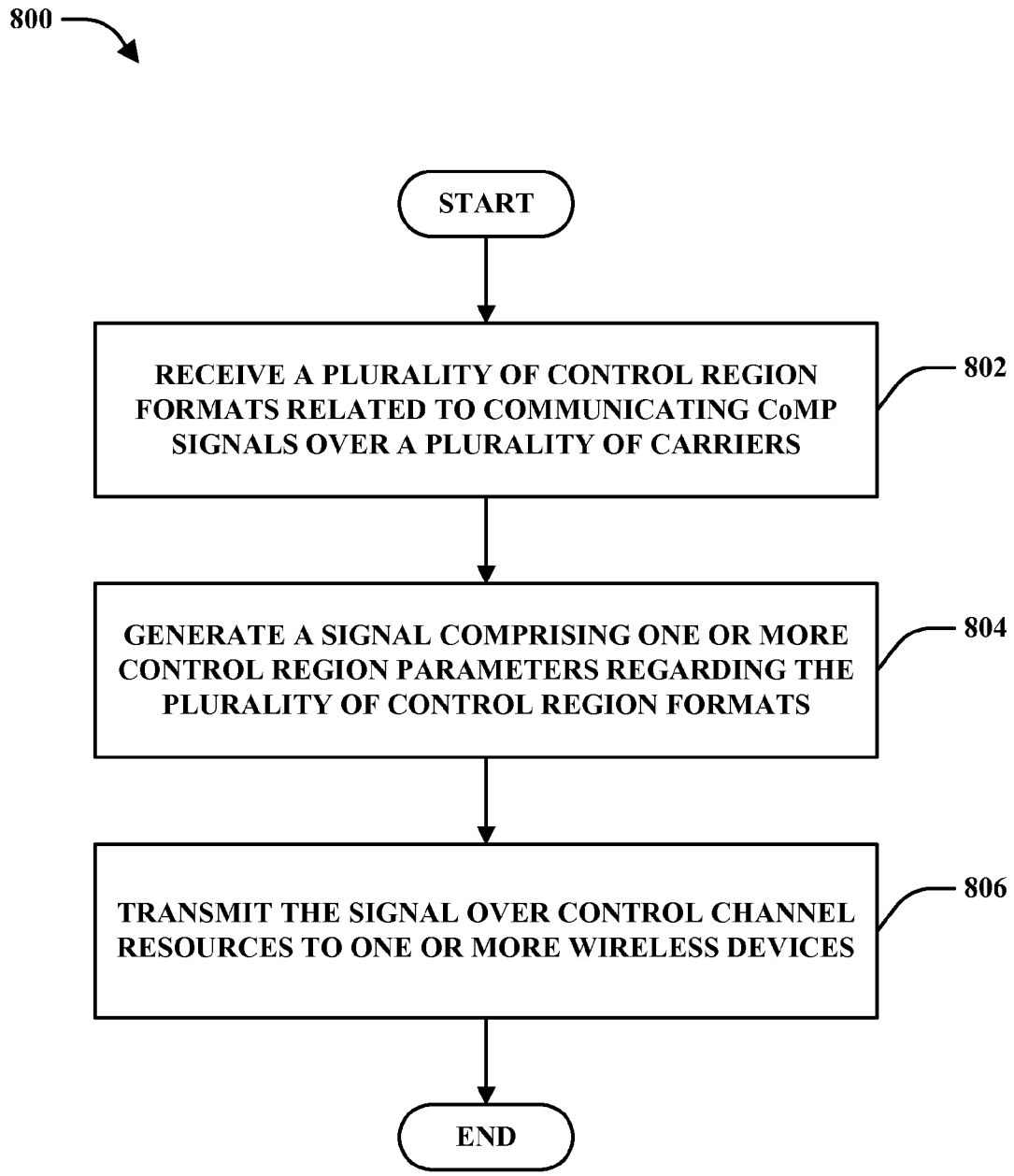
FIG. 8 is a flow diagram of an example methodology that provides control region parameters for one or more transmission points.

Referring now to FIGS. 6-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning now to FIG. 6, an example methodology 600 is shown that facilitates determining data portions of received signals based at least in part on received control region parameters. At 602, one or more control region parameters can be received regarding a plurality of carriers related to CoMP communications. As described, in an example, the plurality of carriers can each correspond to an access point providing CoMP communications. In addition, the one or more control region parameters can include a size of a control region (e.g., as a number of symbols) starting in a communication frame, an index of a starting data symbol in a frame, and/or the like, as described. In addition, the control region parameters can relate to a single access point or carrier and/or multiple access points or carriers in CoMP communications. In one example, the control region parameters can be received over control channel resources and can relate to each of the plurality of carriers (and/or corresponding access points). In another example, a control region parameter can be received over a control format indicator channel, which can relate to a serving access point. Moreover, for example, the control region parameter can be a configured value, as described.

At 604, a data portion of one or more signals received over one of the plurality of carriers can be determined based on the one or more control region parameters. For example, where the control region parameters relate to each carrier, the data portion can be determined based on the control region parameter(s) for that carrier (or corresponding access point). Where the control region parameter relates to a serving access point, the data portion can be determined based on the control region parameter regardless of the carrier (or access point) to which the control region parameter relates. In addition, for example, where the control region parameter is a configured value, the data portion can be determined based on the value. Similarly, at 606, a disparate data portion of one or more disparate signals received over a disparate one of the plurality of carriers can be determined based on the one or more control region parameters.

Referring to FIG. 7, an example methodology 700 that determines blank resources based on receiving different control region parameters is illustrated. At 702, a control region parameter can be received regarding a carrier over a control format indicator channel. As described, for example, the control region parameter can relate to a serving access point. At 704, one or more disparate control region parameters related to one or more disparate carriers can be received over a control channel. As described, for example, the one or more disparate control region parameters can correspond to a control region from various CoMP access points. At 706, blank resources can be determined in a control region based on resources indicated by the control region parameter that are absent from the one or more disparate control region parameters. Thus, for example, where the control region parameter relates to extra resources, those resources can be blank since they are not used in CoMP communications. It is to be appreciated that the blank resources can be utilized to measure interference, receive other data from the serving access point or one or more disparate access points, etc.

Turning now to FIG. 8, an example methodology 800 is shown that facilitates providing control region parameters for one or more access points. At 802, a plurality of control region formats related to communicating CoMP signals over a plurality of carriers can be received. As described, the plurality of carriers can each relate to an access point. Moreover, the control region formats can specify a number of symbols comprising a control region for the plurality of carriers, an index of a starting data symbol, etc., as described. At 804, a signal can be generated comprising one or more control region parameters regarding the plurality of control region formats. At 806, the signal can be transmitted to one or more wireless devices over control channel resources. Thus, the one or more wireless devices can utilize the control region parameters to determine control and data regions for received signals, as described.

It will be appreciated that, in accordance with one or more aspects described herein, inferences can be made regarding determining control region parameters, utilizing control region parameters to determine a control or data region, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
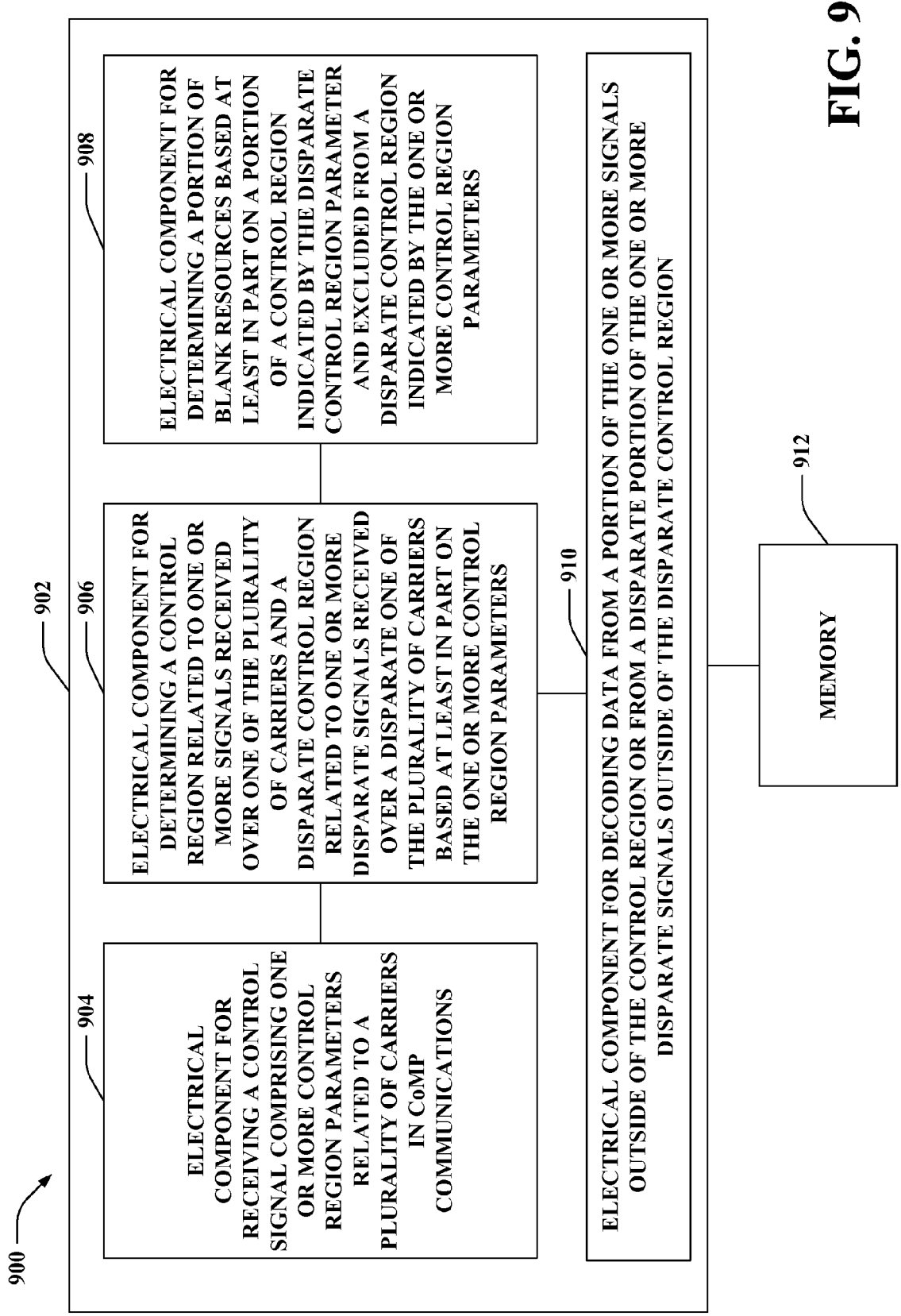
FIG. 9 is a block diagram of an example apparatus that receives control region parameters for multiple transmission points.

With reference to FIG. 9, illustrated is a system 900 that facilitates determining control regions of signals based at least in part on received control region parameters. For example, system 900 can reside at least partially within a base station, mobile device, or another device that provides access to a wireless network. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a control signal comprising one or more control region parameters related to a plurality of carriers in CoMP communications 904. As described, the plurality of carriers can each relate to an access point. Moreover, for example, electrical component 904 can receive the one or more control region parameters over a control channel, a control format indicator channel, a configured value, etc. In addition, the one or more control region parameters can relate to a control region format of a serving access point, one or more CoMP access points, and/or the like, and can include a size of a control region with respect to a number of symbols in a communication frame, a symbol index of a starting symbol for data communications, etc., as described.

Further, logical grouping 902 can comprise an electrical component for determining a control region related to one or more signals received over one of the plurality of carriers and a disparate control region related to one or more disparate signals received over a disparate one of the plurality of carriers based at least in part on the one or more control region parameters 906. In this regard, as described, the one or more control region parameters can be shared for the plurality of carriers, or can relate to each individual carrier. Moreover, logical grouping 902 can include an electrical component for determining a portion of blank resources based at least in part on a portion of a control region indicated by a disparate control region parameter and excluded from a disparate control region indicated by the one or more control region parameters 908. As described, a serving access point can indicate a larger control region for itself than for other CoMP access points. In this regard, electrical component 908 can determine blank resources from a difference in the control regions. Further, logical grouping 902 includes an electrical component for decoding data from a portion of the one or more signals outside of the control region or from a disparate portion of the one or more disparate signals outside of the disparate control region 910. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
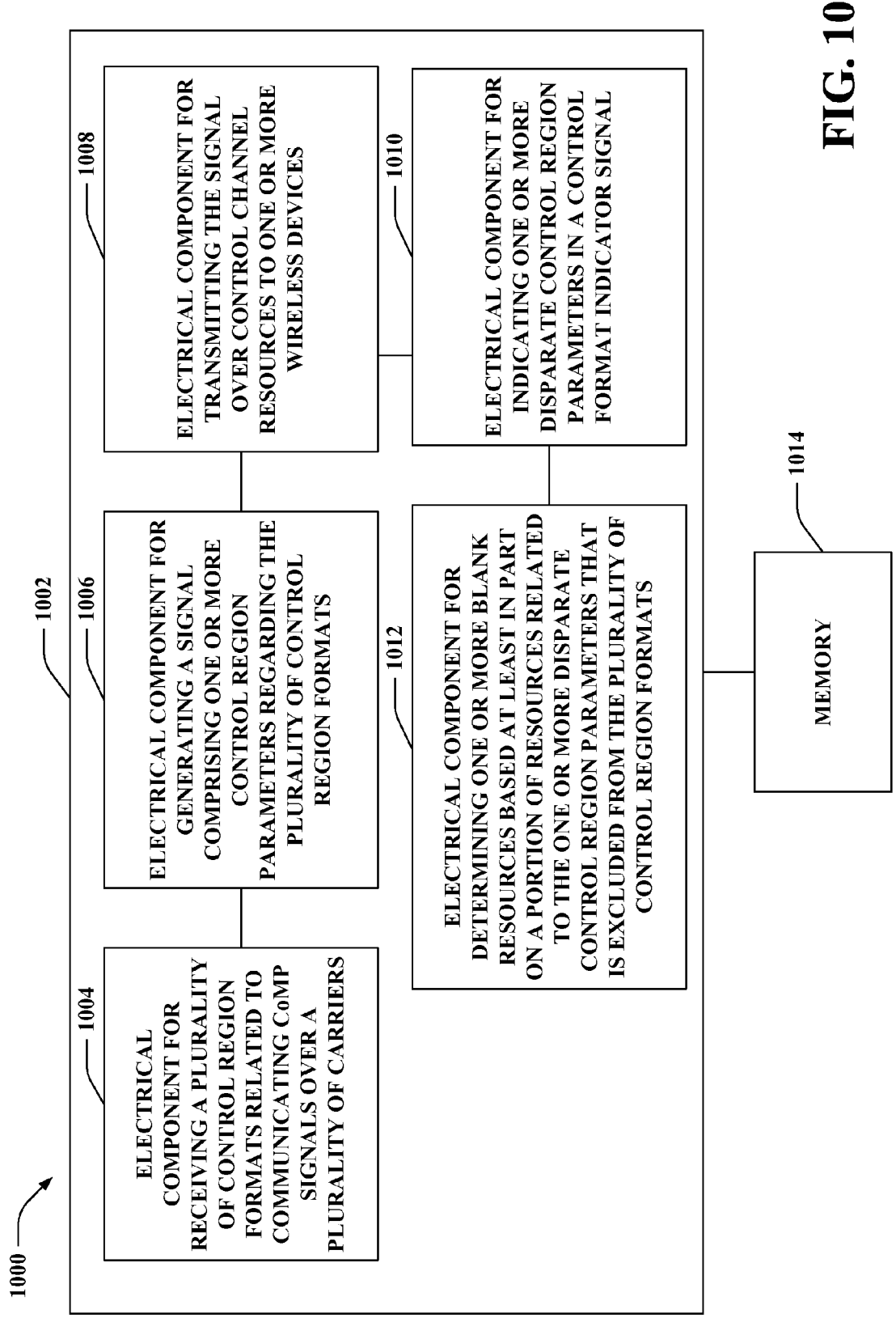
FIG. 10 is a block diagram of an example apparatus that provides control region parameters for multiple transmission points.

With reference to FIG. 10, illustrated is a system 1000 that indicates control region parameters for one or more access points. For example, system 1000 can reside at least partially within a base station, mobile device, or another device that provides access to a wireless network. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a plurality of control region formats related to communicating CoMP signals over a plurality of carriers 1004. As described, plurality of carriers can each relate to an access point. Moreover, as described, the control region formats can specify a control region size, an index of a starting data symbol, and/or the like. Further, logical grouping 1002 can comprise an electrical component for generating a signal comprising one or more control region parameters regarding the plurality of control channel formats 1006. Moreover, logical grouping 1002 can include an electrical component for transmitting the signal over control channel resources to one or more wireless devices 1008.

In this regard, the one or more wireless devices can determine control regions of signals subsequently received from system 1000 and/or one or more CoMP access point, and can utilize the control region determination to interpret data in the signals. Furthermore, logical grouping 1002 includes an electrical component for indicating one or more disparate control region parameters in a control format indicator signal 1010. As described, for example, the disparate control region parameter can relate explicitly to system 1000 (e.g., a serving access point) while the one or more control region parameters generated by electrical component 1006 can relate to a plurality of carriers or CoMP access points. In addition, logical grouping 1002 includes an electrical component for determining one or more blank resources based at least in part on a portion of resources related to the one or more disparate control region parameters that is excluded from the plurality of control region formats. Thus, where there is disparity between a control region of system 1000 and of one or more CoMP access points, resulting blank resources can be identified and utilized to transmit special control data, for example. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
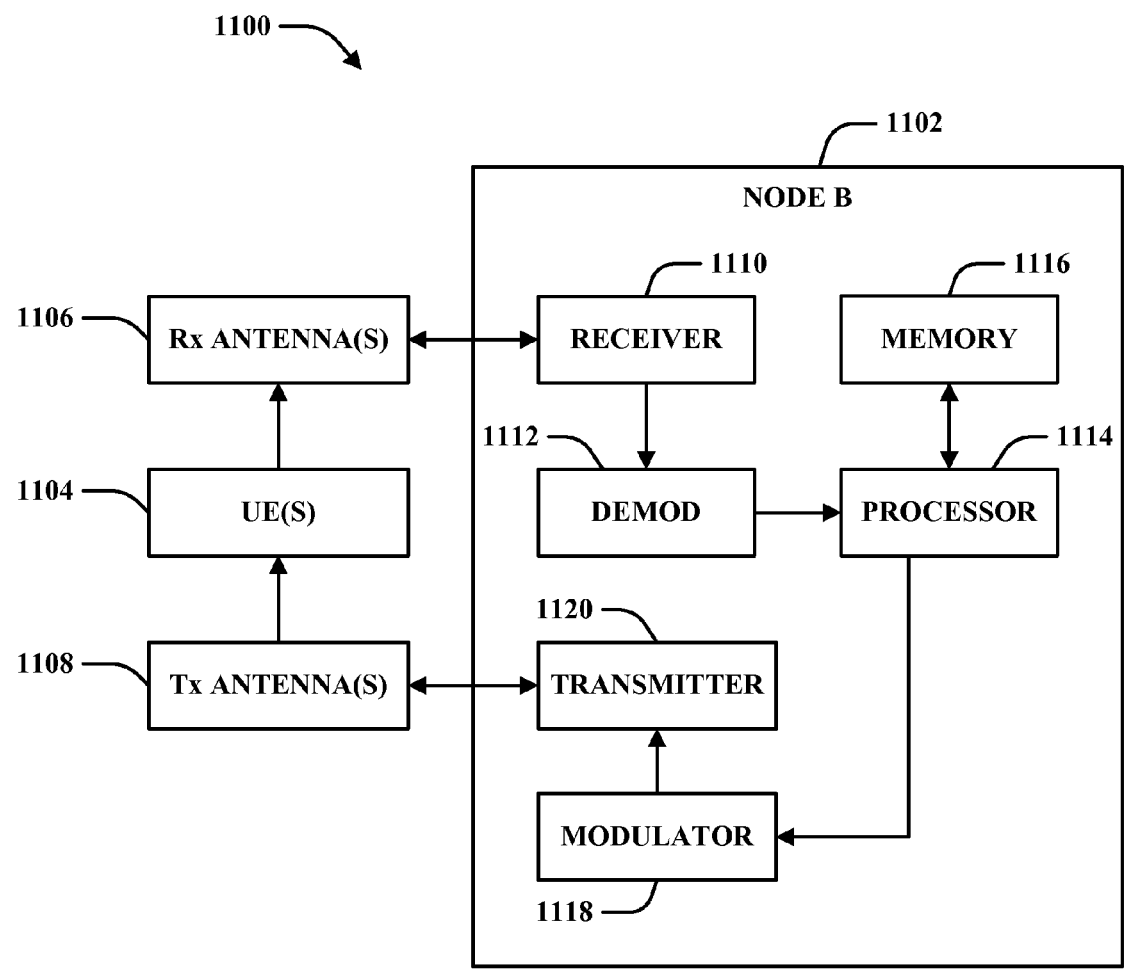
FIGS. 11-12 are block diagrams of example wireless communication devices that can be utilized to implement various aspects of the functionality described herein.

FIG. 11 is a block diagram of a system 1100 that can be utilized to implement various aspects of the functionality described herein. In one example, system 1100 includes a base station or Node B 1102. As illustrated, Node B 1102 can receive signal(s) from one or more UEs 1104 via one or more receive (Rx) antennas 1106 and transmit to the one or more UEs 1104 via one or more transmit (Tx) antennas 1108. Additionally, Node B 1102 can comprise a receiver 1110 that receives information from receive antenna(s) 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, Node B 1102 can employ processor 1114 to perform methodologies 600, 700, 800, and/or other similar and appropriate methodologies. Node B 1102 can also include a modulator 1118 that can multiplex a signal for transmission by a transmitter 1120 through transmit antenna(s) 1108.

Figure 12:
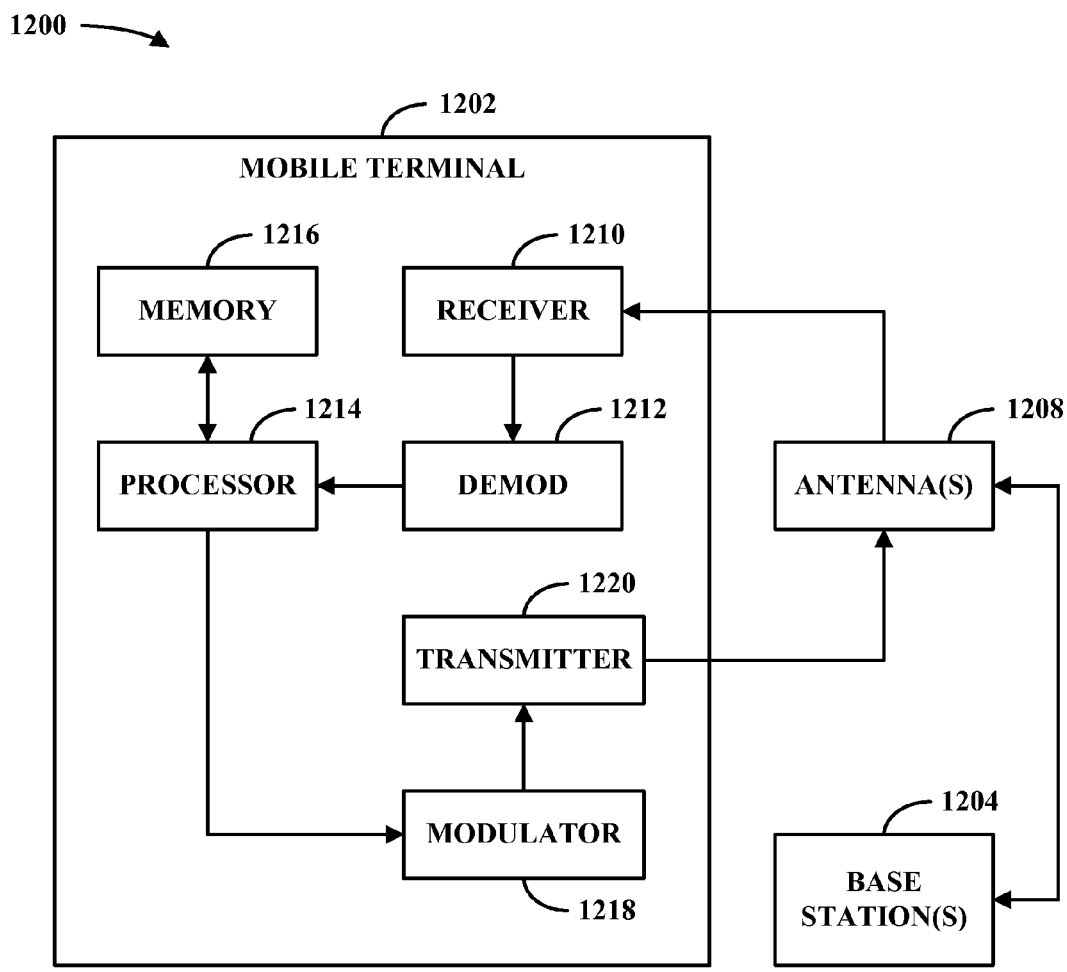

FIG. 12 is a block diagram of another system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies 600, 700, 800, and/or other similar and appropriate methodologies. Mobile terminal 1202 can also employ one or more components described in previous figures to effectuate the described functionality; in one example, the components can be implemented by the processor 1214. Mobile terminal 1202 can also include a modulator 1218 that can multiplex a signal for transmission by a transmitter 1220 through antenna(s) 1208.

Figure 13:
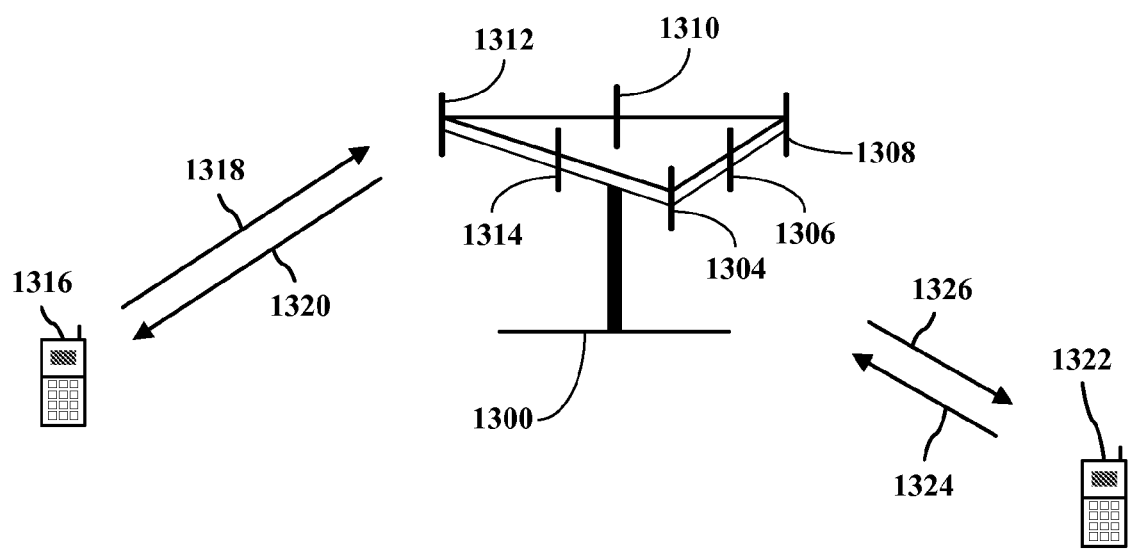
FIG. 13 illustrates an example wireless multiple-access communication system in accordance with various aspects set forth herein.

Referring now to FIG. 13, an illustration of a wireless multiple-access communication system is provided in accordance with various aspects. In one example, an access point 1300 (AP) includes multiple antenna groups. As illustrated in FIG. 13, one antenna group can include antennas 1304 and 1306, another can include antennas 1308 and 1310, and another can include antennas 1312 and 1314. While only two antennas are shown in FIG. 13 for each antenna group, it should be appreciated that more or fewer antennas may be utilized for each antenna group. In another example, an access terminal 1316 can be in communication with antennas 1312 and 1314, where antennas 1312 and 1314 transmit information to access terminal 1316 over forward link 1320 and receive information from access terminal 1316 over reverse link 1318. Additionally and/or alternatively, access terminal 1322 can be in communication with antennas 1306 and 1308, where antennas 1306 and 1308 transmit information to access terminal 1322 over forward link 1326 and receive information from access terminal 1322 over reverse link 1324. In a frequency division duplex system, communication links 1318, 1320, 1324 and 1326 can use different frequency for communication. For example, forward link 1320 may use a different frequency then that used by reverse link 1318.

Each group of antennas and/or the area in which they are designed to communicate can be referred to as a sector of the access point. In accordance with one aspect, antenna groups can be designed to communicate to access terminals in a sector of areas covered by access point 1300. In communication over forward links 1320 and 1326, the transmitting antennas of access point 1300 can utilize beamforming in order to improve the signal-to-noise ratio of forward links for the different access terminals 1316 and 1322. Also, an access point using beamforming to transmit to access terminals scattered randomly through its coverage causes less interference to access terminals in neighboring cells than an access point transmitting through a single antenna to all its access terminals.

An access point, e.g., access point 1300, can be a fixed station used for communicating with terminals and can also be referred to as a base station, a Node B, an access network, and/or other suitable terminology. In addition, an access terminal, e.g., an access terminal 1316 or 1322, can also be referred to as a mobile terminal, user equipment, a wireless communication device, a terminal, a wireless terminal, and/or other appropriate terminology.

Figure 14:
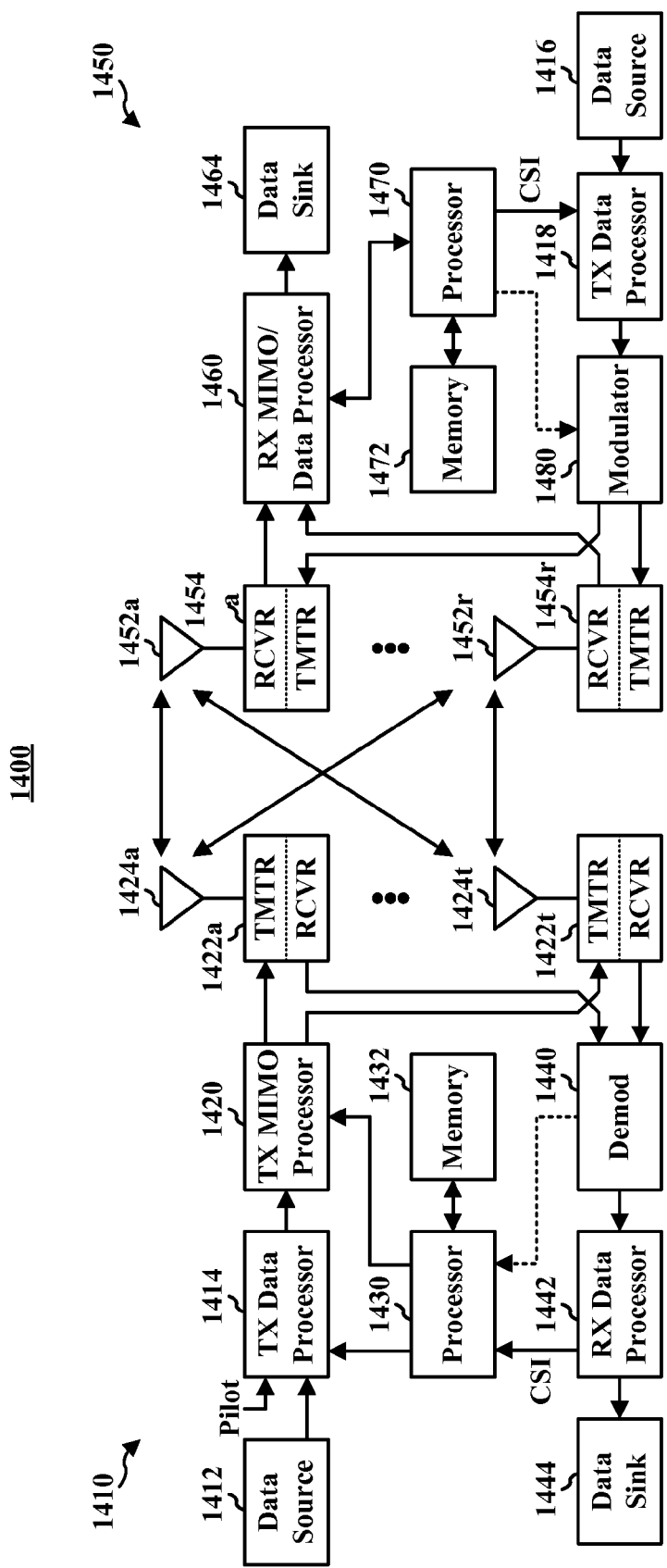
FIG. 14 is a block diagram illustrating an example wireless communication system in which various aspects described herein can function.

Referring now to FIG. 14, a block diagram illustrating an example wireless communication system 1400 in which various aspects described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX MIMO processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and up-convert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and down-convert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454 based on a particular receiver processing technique to provide $N_T$ "detected" symbol streams. In one example, each detected symbol stream can include symbols that are estimates of the modulation symbols transmitted for the corresponding data stream. RX MIMO/data processor 1460 can then process each symbol stream at least in part by demodulating, deinterleaving, and decoding each detected symbol stream to recover traffic data for a corresponding data stream. Thus, the processing by RX MIMO/data processor 1460 can be complementary to that performed by TX MIMO processor 1420 and TX data processor 1418 at transmitter system 1410. RX MIMO/data processor 1460 can additionally provide processed symbol streams to a data sink 1464.

In accordance with one aspect, the channel response estimate generated by RX MIMO/data processor 1460 can be used to perform space/time processing at the receiver, adjust power levels, change modulation rates or schemes, and/or other appropriate actions. Additionally, RX MIMO/data processor 1460 can further estimate channel characteristics such as, for example, signal-to-noise-and-interference ratios (SNRs) of the detected symbol streams. RX MIMO/data processor 1460 can then provide estimated channel characteristics to a processor 1470. In one example, RX MIMO/data processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   receiving, from a serving access point, at least a first control region parameter related to a first carrier in a control format indicator signal over control format indicator channel resources;
   receiving, from the serving access point, at least a second control region parameter related to a second carrier over control channel resources;
   determining a first data portion of one or more first signals received over a first one of a plurality of carriers based on one or more of the first control region parameter or the second control region parameter;
   determining a second data portion of one or more second signals received over a second one of the plurality of carriers based on one or more of the first control region parameter or the second control region parameter; and
   determining one or more blank resources based at least in part on a difference between the first control region parameter and the second control region parameter.

2. The method of claim 1, further comprising receiving the one or more first signals over the first carrier from the serving access point and the one or more second signals over the second carrier from a neighboring access point.

3. The method of claim 1, further comprising:
   receiving the first control region parameter and the second control region parameter for each of the plurality of carriers from the serving access point over the control channel resources.

4. The method of claim 3, wherein at least one of the first control region parameter or the second control region parameter comprises a control region size with respect to a number of symbols beginning in a frame, or an index of a symbol from which data communications start in the frame.

5. The method of claim 1, further comprising measuring interference from one or more neighboring access points during the one or more blank resources.

6. The method of claim 1, further comprising receiving control signaling during the one or more blank resources.

7. The method of claim 1, wherein the determining the second data portion of the one or more second signals includes determining the second data portion of one or more second signals based at least in part on the one or more of the first control region parameter or the second control region parameter.

8. The method of claim 1, wherein the receiving at least the first control region parameter and the second control region parameter is from at least one of a configuration, a hardcoding, or a network specification.

9. The method of claim 1, further comprising:
   decoding data from at least one of: the first data portion of the one or more first signals received over the first carrier or the second data portion of the one or more second signals received over the second carrier.

10. The method of claim 9, further comprising:
    receiving an indication from the serving access point relating to a subset of symbols reserved for data communications.

11. A wireless communications apparatus, comprising:
    at least one processor; and
    a memory communicatively coupled to the at least one processor, wherein the memory is configured to, when executed by the at least one processor, cause the at least one processor to:
    receive, from a serving access point, at least a first control region parameter related to a first carrier in a control format indicator signal over control format indicator channel resources;
    receive, from the serving access point, at least a second control region parameter related to a second carrier over control channel resources;
    determine a first data portion of one or more first signals received over a first one of a plurality of carriers based on one or more of the first control region parameter or the second control region parameter;
    determine a second data portion of one or more second signals received over a second one of the plurality of carriers based on one or more of the first control region parameter or the second control region parameter; and
    detect blank resources where one of the control region parameters indicates a larger control region than the other of the control region parameters.

12. The wireless communications apparatus of claim 11, wherein each of the plurality of carriers relates to at least one of a plurality of access points that provide coordinated multiple point (CoMP) communications.

13. The wireless communications apparatus of claim 11, wherein the at least one processor is further configured to receive at least one of the first control region parameter or the second control region parameter over at least one of the control format indicator channel resources or the control channel resources from the serving access point.

14. The wireless communications apparatus of claim 11, wherein at least one of the first control region parameter or the second control region parameter includes a number of initial symbols that comprise at least one of a control region within a frame, or an index of a symbol related to beginning of data communications with the frame for one or more of the first carrier or the second carrier.

15. An apparatus, comprising:
    means for receiving, from a serving access point, at least a first control region parameter related to a first carrier in a control format indicator signal over control format indicator channel resources;
    means for receiving, from the serving access point, at least a second control region parameter related to a second carrier over control channel resources;
    means for determining a first data portion of one or more first signals received over a first one of a plurality of carriers based at least in part on one or more of the first control region parameter or the second control region parameter;
    means for determining a second data portion of one or more second signals received over a second one of the plurality of carriers based at least in part on one or more of the first control region parameter or the second control region parameter; and
    means for determining one or more blank resources based at least in part on a difference between the first control region parameter and the second control region parameter.

16. The apparatus of claim 15, wherein each of the first carrier and the second carrier relates to at least one access point in a coordinated multiple point (CoMP) communication environment.

17. A computer program product, comprising:
a non-transitory computer-readable medium;
wherein the non-transitory computer-readable medium comprises:
code for causing at least one computer to receive, from a serving access point, at least a first control region parameter related to a first carrier in a control format indicator signal over control format indicator channel resources and a second control region parameter related to a second carrier over control channel resources;
code for causing the at least one computer to determine a first data portion of one or more first signals received over a first one of a plurality of carriers based at least in part on one of the first control region parameter or the second control region parameter;
code for causing the at least one computer to decode a second data portion of one or more second signals received over a second one of the plurality of carriers based at least in part on one or more of the first control region parameter or the second control region parameter; and
code for causing the at least one computer to determine one or more blank resources based at least in part on a difference between the first control region parameter and the second control region parameter.

18. The computer program product of claim 17, wherein each of the plurality of carriers relates to at least one of a plurality of access points that provide coordinated multiple point (CoMP) communications.

19. The computer program product of claim 17, wherein at least one of the first control region parameter or the second control region parameter includes a number of initial symbols that comprise at least one of a control region within a frame, or an index of a symbol related to beginning of data communications within the frame for one or more of the first carrier or the second carrier.

20. An apparatus, comprising:
a receiving component configured to receive, from a serving access point, at least a first control region parameter related to a first carrier in a control format indicator signal over control format indicator channel resources and a second control region related to a second carrier in a coordinated multiple point (CoMP) communication environment over control channel resources;
a first data portion determining component configured to determine a first data portion of one or more first signals received over a first one of a plurality of carriers based at least in part on one or more of the first control region parameter or the second control region parameter;
a second data portion determining component configured to determine a second data portion of one or more second signals received over a second one of the plurality of carriers based at least in part on one or more of the first control region parameter or the second control region parameter; and
a blank resource determining component configured to determine one or more blank resources based at least in part on a difference between the first control region parameter and the second control region parameter.

21. The apparatus of claim 20, wherein each of the first carrier and the second carrier relates to at least one access point in the CoMP communication environment.

22. A method, comprising:
receiving a plurality of control region formats related to communicating coordinated multiple point (CoMP) signals over a plurality of carriers;
generating a signal comprising one or more first control region parameters regarding the plurality of control region formats;
transmitting the signal to one or more wireless devices;
indicating one or more second control region parameters in a control format indicator signal;
transmitting the control format indicator signal to the one or more wireless devices over control format indicator channel resources; and
determining one or more blank resources based at least in part on a portion of resources related to the one or more second control region parameters that is excluded from the plurality of control region formats.

23. The method of claim 22, wherein the receiving the plurality of control region formats includes receiving the plurality of control region formats from a plurality of access points that implement CoMP communications relating to the plurality of carriers.

24. The method of claim 22, further comprising transmitting a communication to the one or more wireless devices using the one or more blank resources.

25. The method of claim 22, further comprising:
determining a subset of symbols in a frame related to data communications; and
indicating the subset of symbols to the one or more wireless devices.

26. A wireless communications apparatus, comprising:
at least one processor; and
a memory communicatively coupled to the at least one processor, wherein the memory is configured to, when executed by the at least one processor, cause the at least one processor to:
receive a plurality of control region formats related to communicating coordinated multiple point (CoMP) signals over a plurality of carriers;
generate a signal comprising one or more first control region parameters regarding the plurality of control region formats; transmit the signal over control channel resources allocated to one or more wireless devices;
indicate one or more second control region parameters in a control format indicator signal;
transmit the control format indicator signal to the one or more wireless devices over control format indicator channel resources; and
determine one or more blank resources based at least in part on a portion of resources related to the one or more second control region parameters that is excluded from the plurality of control region formats.

27. The wireless communications apparatus of claim 26, wherein each of the plurality of carriers relates to at least one of a plurality of access points.

28. An apparatus, comprising:
means for receiving a plurality of control region formats related to communicating coordinated multiple point (CoMP) signals over a plurality of carriers;
means for generating a signal comprising one or more first control region parameters regarding the plurality of control region formats;
means for transmitting the signal over control channel resources allocated to one or more wireless devices;
means for indicating one or more second control region parameters in a control format indicator signal;

means for transmitting the control format indicator signal to the one or more wireless devices over control format indicator channel resources; and means for determining one or more blank resources based at least in part on a portion of resources related to the one or more second control region parameters that is excluded from the plurality of control region formats.

29. The apparatus of claim 28, wherein each of the plurality of carriers relates to at least one of a plurality of access points.

30. A computer program product, comprising:

a non-transitory computer-readable medium;

wherein the non-transitory computer-readable medium comprises:

code for causing at least one computer to receive a plurality of control region formats related to communicating coordinated multiple point (CoMP) signals over a plurality of carriers;

code for causing the at least one computer to generate a signal comprising one or more first control region parameters regarding the plurality of control region formats; code for causing the at least one computer to transmit the signal over control channel resources allocated to one or more wireless devices;

code for causing the at least one computer to indicate one or more second control region parameters in a control format indicator signal;

code for causing the at least one computer to transmit the control format indicator signal to the one or more wireless devices over control format indicator channel resources; and code for causing the at least one computer to determine one or more blank resources based at least in part on a portion of resources related to the one or more second control region parameters that is excluded from the plurality of control region formats.

31. The computer program product of claim 30, wherein each of the plurality of carriers relates to at least one of a plurality of access points.

32. The computer program product of claim 30, wherein the computer-readable medium further comprises code for causing the at least one computer to transmit a second signal over control format indicator channel resources that relates to at least the second control region parameter.

33. An apparatus, comprising:

a control parameter receiving component configured to receive a plurality of control region formats related to communicating coordinated multiple point (CoMP) signals over a plurality of carriers;

a control channel signaling component configured to generate a signal comprising one or more first control region parameters regarding the plurality of control region formats;

a transmitting component configured to communicate the signal over control channel resources to one or more wireless devices;

a control format signaling component configured to indicate one or more second control region parameters in a control format indicator signal; wherein the transmitting component is further configured to transmit the control format indicator signal to the one or more wireless devices over control format indicator channel resources; and a blank resource determining component configured to determine one or more blank resources based at least in part on a portion of resources related to the one or more second control region parameters that is excluded from the plurality of control region formats.

34. The apparatus of claim 33, wherein each of the plurality of carriers relates to one of a plurality of access points.

35. A method, comprising:

receiving, over a first carrier associated with a serving access point, at least a first control region parameter related to the first carrier and a second control region parameter related to a second carrier associated with a coordinated multiple point (CoMP) access point, wherein the first control region parameter comprises a first index indicating a starting symbol for data transmissions on the first carrier and the second control region parameter comprises a second index indicating a starting symbol for data transmissions on the second carrier;

determining a data portion of a first signal received over the first carrier based at least in part on the first control region parameter; and determining a data portion of a second signal received over the second carrier based at least in part on the second control region parameter.

36. The method of claim 35, further comprising receiving the first signal over the first carrier from the serving access point and the second signal over the second carrier from the CoMP access point.

37. The method of claim 35, further comprising receiving the first control region parameter and the second control region parameter from the serving access point over allocated control channel resources.

38. The method of claim 35, wherein the first control region parameter and the second control region parameter comprise different control region sizes.

39. The method of claim 35, further comprising determining one or more blank resources based at least in part on a difference between the first control region parameter and the second control region parameter.

40. The method of claim 39, further comprising measuring interference from one or more neighboring access points during the one or more blank resources.

41. The method of claim 40, further comprising receiving control signaling during the one or more blank resources.

42. A wireless communications apparatus, comprising:

at least one processor; and a memory communicatively coupled to the at least one processor, wherein the memory is configured to, when executed by the at least one processor, cause the at least one processor to:

receive, over a first carrier associated with a serving access point, at least a first control region parameter related to the first carrier and a second control region parameter related to a second carrier associated with a coordinated multiple point (CoMP) access point, wherein the first control region parameter comprises a first index indicating a starting symbol for data transmissions on the first carrier and the second control region parameter comprises a second index indicating a starting symbol for data transmissions on the second carrier;

determine a data portion of a first signal received over the first carrier based at least in part on the first control region parameter; and determine a data portion of a second signal received over the second carrier based at least in part on the second control region parameter.

43. The wireless communications apparatus of claim 42, wherein the memory is further configured to cause the at least one processor to receive the first signal over the first carrier from the serving access point and the second signal over the second carrier from the CoMP access point.

44. The wireless communications apparatus of claim 42, wherein the memory is further configured to cause the at least one processor to receive the first control region parameter of the first carrier and the second control region parameter from the serving access point over allocated control channel resources.

45. The wireless communications apparatus of claim 44, wherein the first control region parameter and the second control region parameter signal different control region sizes.

46. The wireless communications apparatus of claim 44, wherein the memory is further configured to cause the at least one processor to determine one or more blank resources based at least in part on a difference between the first control region parameter and the second control region parameter.

47. The wireless communications apparatus of claim 46, wherein the memory is further configured to cause the at least one processor to measure interference from one or more neighboring access points during the one or more blank resources.

48. The method of claim 35, further comprising:
  receiving, from the serving access point, the first control region parameter in a control format indicator signal over control format indicator channel resources;
  receiving, from the serving access point, the second control region parameter over control channel resources.

49. The wireless communications apparatus of claim 46, wherein the memory is further configured to cause the at least one processor to:
  receive, from the serving access point, the first control region parameter in a control format indicator signal over control format indicator channel resources;
  receive, from the serving access point, the second control region parameter over control channel resources.

* * * * *